United States Patent [19]

Bruder et al.

[11] Patent Number: 4,994,979
[45] Date of Patent: Feb. 19, 1991

[54] SYSTEM FOR PREVENTING THE COLLISION OF TWO CUTTING TOOLS

[75] Inventors: Wolfgang Bruder, Bielefeld; Klaus Biervert, Spenge; Gerd Kupper, Bad Salzuflen, all of Fed. Rep. of Germany

[73] Assignee: Durkopp System Technik GmbH, Fed. Rep. of Germany

[21] Appl. No.: 327,301

[22] Filed: Mar. 22, 1989

[30] Foreign Application Priority Data

Mar. 22, 1989 [DE] Fed. Rep. of Germany ....... 3809630

[51] Int. Cl.⁵ ...................... B26D 5/00; B23Q 15/007
[52] U.S. Cl. .................................. 364/474.09; 83/74; 83/177; 83/526; 83/940; 83/62.1; 364/474.2
[58] Field of Search .................... 83/53, 62, 62.10, 71, 83/72, 74, 177, 62, 526, 936, 939, 940; 364/474.09, 474.19, 474.2; 408/5; 409/190–191, 193, 186, 202, 134, 80

[56] References Cited

U.S. PATENT DOCUMENTS

| | | | |
|---|---|---|---|
| 2,809,541 | 11/1953 | Witt | 83/62 X |
| 3,626,796 | 12/1971 | Pearl | 83/940 X |
| 3,769,488 | 10/1973 | Hasslinger | 83/940 X |
| 4,131,836 | 12/1978 | Noda | 364/474.2 X |
| 4,267,914 | 5/1981 | Saar | 83/62 X |
| 4,442,493 | 4/1984 | Wakai et al. | 364/474.19 |
| 4,471,676 | 9/1984 | Mason | 364/474.2 X |
| 4,489,377 | 12/1984 | Mawyer | 364/474.2 |
| 4,651,601 | 3/1987 | Sasaki | 364/474.2 X |
| 4,736,661 | 4/1988 | Shirai | 83/71 X |
| 4,758,961 | 7/1988 | Uemura et al. | 364/474.2 X |

Primary Examiner—Hien H. Phan
Assistant Examiner—Kenneth E. Peterson
Attorney, Agent, or Firm—Ostrolenk, Faber, Gerb & Soffen

[57] ABSTRACT

A system for preventing the collision of two cutting tools in a computer-controlled cutting unit in which the two cutting tools may at times be moved toward each other. This system determines the actual position of each cutting tool during the cutting process. The distance between the two cutting tools is determined and is compared with a previously specified tolerated separation by means of a comparator in the computer. As soon as the tolerated separation has been reached, the system shuts off the cutting unit. In addition, an electrical safety circuit prevents the cutting unit from starting up again automatically after an automatic shutdown.

15 Claims, 7 Drawing Sheets

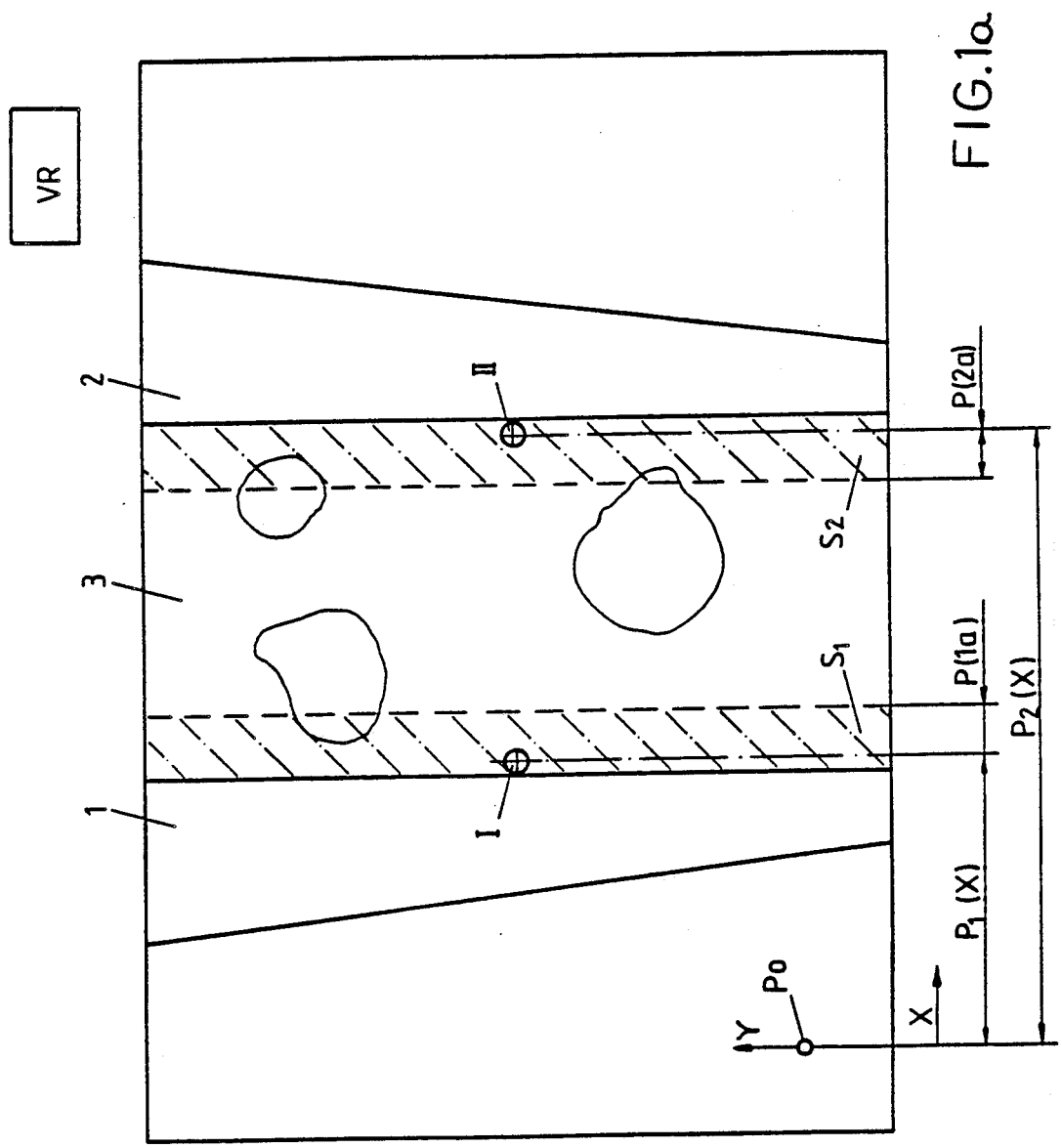

SYSTEM FOR PREVENTING THE COLLISION OF TWO CUTTING TOOLS

BACKGROUND OF THE INVENTION

This invention relates to a system for preventing the collision of two cutting tools in a computer-controlled cutting unit, wherein the two cutting tools may at times be moved toward each other.

German Unexamined patent application OS 3,321,954 (equivalent to U.S. Pat. No. 4,463,639) discloses an ultrahigh-pressure water-jet cutting unit with a cutting system consisting of a cutting portal and a cutting-head support located thereon. The contours to be cut out of the material by the high-pressure jet located in the cutting-head support are entered manually into a computer connected to the cutting system, in the form of data comprising pairs of coordinates, and are then cut out individually with the high-pressure jet open.

Various systems have been proposed in an attempt to shorten the processing time required to carry out cutting operations on such a machine.

Particularly in the case where several patterns are to be cut out of a blank, procedures are disclosed in German Patent No. 3,544,251 (equivalent to U.S. Pat. No. 4,901,359) and German Unexamined patent application OS 3,627,110 (equivalent to U.S. Ser. No. 07/070,902 filed July 8, 1987, now U.S. Pat. No. 4,941,183) by means of which a rapid layout of the cutting patter becomes possible and, at the same time, the contours of the individual patterns and their positions are automatically reported to the computer. Then, in each case, these contours are cut out in the sequence in which they were received by the computer. With this procedure, however, only the portions of the processing time that previously depended on the speed of the operating personnel, namely the pattern layout and the contour data input, are improved.

In order to reduce the processing time required to cut material in accordance with several patterns from a web of fabric or a large plate-shaped material on a computer-controlled cutting unit, several cutting tools can be used simultaneously for the cutting process.

If two cutting tools are used, they can be arranged in such a way that, starting the cutting simultaneously from the outer edge of the cutting table of the cutting unit, they move toward each other and each cuts along one-half of each predetermined cutting line in the longitudinal and transverse directions.

To prevent a collision in the center of the cutting table of the cutting portals which receive the cutting tools, it is also conceivable to start the cutting from the center and to terminate it at the edges.

To increase the utilization factor (the ratio of the area of the material cut out, to the area of the original fabric web), one of the cutting tools is desirably moved from the center toward the outside and the other from the outside into the interior region, so that a seamless transition of the cutting lines can be achieved in this way.

With all of the previously mentioned procedures, the cutting time can be reduced by a factor corresponding to the number of cutting tools used, as compared with the cutting time required by a single tool. However, this can be achieved only when the cut is symmetrical with respect to the line on which the starting point and end point of the individual cutting tools is located. For an unsymmetrical cut, the time reduction depends exclusively on the contours of the individual patterns that are to be cut out.

SUMMARY OF THE INVENTION

In view of the foregoing, a central object of the invention is to make further improvements in the total processing time required for a plurality of cutting tools to cut out a given pattern of individual cutting contours.

An improvement would be obtained if it were not necessary to assign a specific cutting range to each cutting portal, but rather if the computer could distribute the cutting to be carried out among the cutting portals, according to the contour data, in such a manner that each portal would complete its cut at the same time or approximately the same time. Since, in this case, the working ranges of the portals may overlap in part, this form of optimization is possible only if it is assured that the portals will not collide with each other during the cutting process.

For this purpose, the distribution among the tools of the cutting sequence of the individual contours that are to be cut out must be made from the viewpoint of avoiding possible collisions. Starting from an arbitrarily selected zero point or point of origin Po, the coordinate family of each cutting contour is entered into the computer. In order to determine the optimal paths of the cutting tools that are now to be carried out, each path is assigned a safety zone describing the closest tolerated approach for every possible or necessary movement in a collision-endangered direction. This safety zone is a constant value that is added to, or subtracted from, the particular position coordinate.

Whether an addition or subtraction of the safety zone is to be carried out depends on the previously selected location of the zero point or point of origin $P_o$. A definition as set forth in FIG. 1a will be assumed herein. In the computer, the distribution of the contours to be cut out later is carried out under the condition that both cutting tools are to complete the cut simultaneously or almost simultaneously and also under the condition:

$$P_{1i}(x) + P(1a) < P_{2i}(x) - P(2a)$$

where
  $P_{1i}$, $P_{2i}$ are the possible positions of the cutting tools in the collision-endangered direction and
  $P(1a)$, $P(2a)$ are the magnitudes of the respective safety zones for the particular cutting tools.

With the previously described data distribution it is theoretically assured that the cutting tools cannot collide during the cutting process. In addition, however, measures must be taken to guarantee that there will be no collision if the cutting tools leave the mathematically determined and preset path. This can occur, for example, if the guides of the cutting tools become dirty over the course of time, or if the forces required to drive the cutting tools increase for some other reason. These situations would cause a change in the accelerability of the cutting tool, which is incorporated in the computer program as a constant instantaneous value, so that the position actually reached by the cutting tool during the cutting process would remain behind the theoretically achieved position according to the computer program.

Thus, the general object of the invention is to create a system for preventing the collision of several cutting tools in a computer-controlled cutting unit under all circumstances.

This object is achieved by a system including the features disclosed and claimed herein.

A particularly advantageous feature of the invention is that the actual position of each cutting tool is always monitored and that the danger of collision arising from unexpected dynamic conditions is prevented.

An example of the invention, representing an ultrahigh-pressure fluid-jet cutting unit equipped with two cutting portals, will be explained below with reference to the drawings.

BRIEF DESCRIPTION OF THE DRAWINGS

FIG. 1a is a simplified plan view of the cutting unit showing the definitions of various parameters discussed herein;

DESCRIPTION OF A PREFERRED EMBODIMENT OF THE INVENTION

Figure 1:
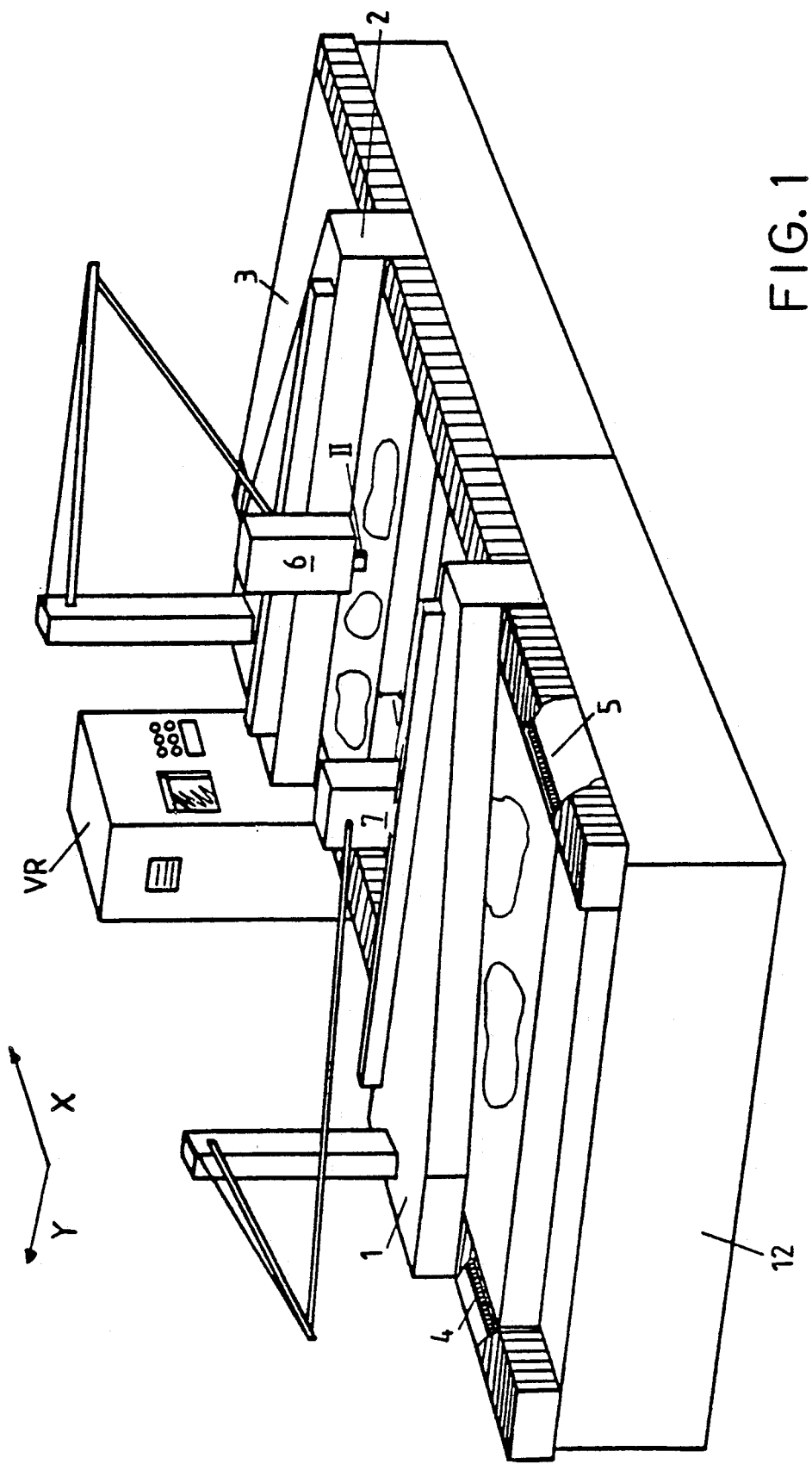
FIG. 1 is a perspective view of an ultrahigh-pressure water-jet cutting unit which embodies the invention.

The mechanical features of an ultrahigh-pressure water-jet cutting unit which embodies the invention are seen in perspective view in FIG. 1.

The cutting portals 1, 2, which are longitudinally displaceable on toothed racks 4, 5, are located side by side on the machine frame 12 above the cutting table 3, each cutting portal 1, 2 being capable of traveling over the complete longitudinal extent of the material to be cut, which is spread out on the cutting table.

The cutting portals 1 and 2 each carry a cutting-head support 6 and 7, respectively, which are supported for transverse displacement on said portals and receive the high-pressure cutting jets I and II, respectively. The cutting portals 1, 2 and the cutting-head supports 6, 7 can be constructed in the form disclosed in German Patent No. 3,637,617. The disclosures of this and all other prior art documents mentioned are incorporated by reference herein. In order to be able to achieve a high average cutting speed, the axial drives are designed in such a manner that they provide a top speed of up to 1 meter/second or more.

Figure 2:
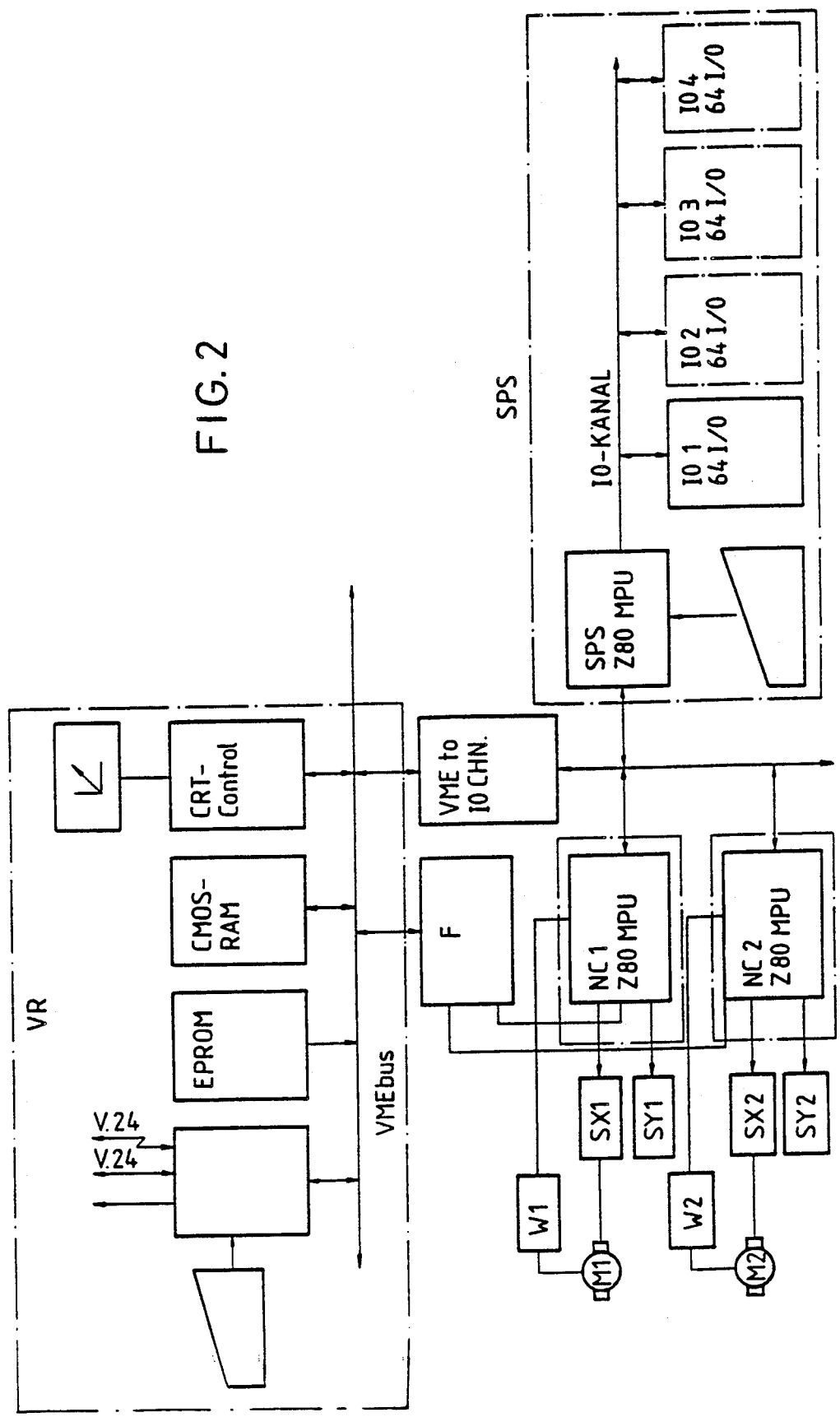
FIG. 2 is a block diagram of the electronic control and monitoring unit.

Referring now to FIG. 2, the two portals 1, 2 and the cutting-head supports 6, 7 are monitored and controlled by means of position-control elements SX1, SX2 and SY1, SY2, which are electrically connected with the management computer VR.

The actual length of the path traveled over by the portals 1 and 2 in each case is determined by means of incremental displacement pickups W1, W2. These pickups are connected in a known manner to the corresponding motors M1, M2 of the portals 1, 2. The displacement pickups are indicated by W1, W2 in FIG. 2, with displacement pickup W1 being associated with cutting portal 1 and displacement pickup W2 with cutting portal 2. This indexing applies also to the motors M1 and M2, which are only represented symbolically, and to the electronic functional units NC1 and NC2 which will be described in greater detail below.

The displacement pickups W1, W2 connected to the motors M1 and M2, respectively, do not necessarily have to operate incrementally; an absolute displacement pickup would be equally conceivable.

The position control elements SX1 and SY1 for monitoring and controlling the longitudinal and transverse movement of the cutting portal 1 are connected, on the one hand, to the electronic functional unit NC1 and, on the other hand, to the drive motor provided for the corresponding direction of movement in each case. The cutting portal 1 is driven by the motor M1, only in the longitudinal direction (X-direction). The transverse direction (Y-direction) is traversed only by the cutting-head support 6. The same applies, correspondingly, for the position-control element SX2 (and motor M2) for the cutting portal 2 and position-control element SY2 for the cutting-head support 7, which are connected to the electronic functional unit NC2.

Only the movement of the cutting portals 1, 2 in the collision-endangered direction (namely the X-direction) is of importance in relation to this invention. For this reason, and for reasons of simplicity, only the drive motors M1, M2, which drive the cutting portals 1, 2, together with the associated displacement pickups W1, W2, are shown in FIG. 2. However, the position control elements SY1, SY2, which are responsible for the transverse movement of the cutting-head supports 6, 7 are also in operative connection with corresponding motors and displacement pickups (not shown).

The functional units NC1, NC2 each comprise an autarkically operating computer, including a Z80 main processor with a program memory and a main memory. Each of these functional units NC1, NC2 is responsible for the control of a respective cutting portal 1, 2.

Both functional units NC1, NC2 are connected to additional electronic functional units SPS and F. The functional unit F serves as a link between the management computer VR and the microprocessor-controlled functional units NC1 and NC2. The management computer VR comprises a central computer with a keyboard, a monitor, a program memory (EPROM), and an operating memory (CMOS-RAM).

The memory-programmable control SPS includes a Z80 microprocessor and serves to operate a plurality of final control elements The control SPS originates, for example, commands to open and close the high-pressure jets I and II.

Given the timing constraints of this apparatus, with path control based on biaxial data coordinate pairs, a maximum speed of at least 1 meter/second and a required precision of, for example, 0.1 mm, reaction times of less than 100 microseconds will be required. The scheme of the hierarchic unit structure shown in FIG. 2 makes possible reaction times so short that each of the functional units SPS, NC1, NC2, can carry out the tasks assigned to it independently of the others, and then receive new tasks or commands from the management computer VR.

A known bus structure (VME-BUS) with a multitask real-time operating unit ensures rapid communication with the management computer VR.

Figure 3:
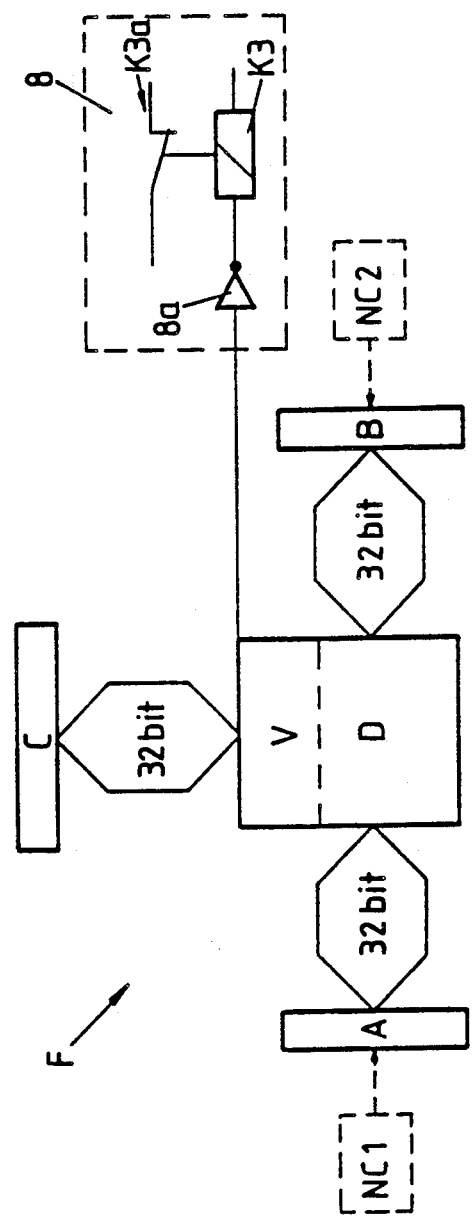
FIG. 3 is a schematic diagram of the 32-bit arithmetic-logical functional unit F of FIG. 2.

Referring now to FIG. 3, the values of the tolerable separation (safety zones) between the two cutting portals 1 and 2, namely P(1a), P(2a), are entered into the register C of the 32-bit arithmetic-logical functional unit F in digitized form and stored. It is assumed that the zero point Po, the direction of movement, and the safety zones S1, S2 of the cutting portals 1, 2 have been defined as shown in FIG. 1a. According to this definition, an impending collision can be represented mathematically by the following equation:

$$P_1(x) + P(1a) = P_2(x) - P(2a)$$

where
- $P_1(x)$ is the distance traveled by the portal 1 (by the cutting jet I) with respect to the zero point $P_o$,
- $P_2(x)$ is the distance traveled by the portal 2 (by the cutting jet II) with respect to the zero point $P_o$, and
- $P(1a)$, $P(2a)$ are the safety zones of the cutting portals 1 and 2 with respect to the cutting jets 1 and 2, respectively.

By transformation of the above equation, the maximum still tolerable value of the separation between the cutting portals is determined by the following relationship:

$$P_2(x) - P_1(x) > P(1a) + P(2a)$$

In each case, the next target coordinate $P_1(x)$ in the collision-endangered direction (namely the X-direction) of the cutting portal 1 is entered into the register A of the functional unit F by the functional unit NC1 and is stored. The functional unit NC2 enters the next target coordinate $P_2(x)$ of the cutting portal 2 into the register B of the functional unit F in each case, and this value is also stored. The values from the registers A and B are subtracted by a subtractor D in the functional unit F in accordance with the above equation and the difference is compared with the value of the register C by a comparator V. If the difference is equal to or less than the value of the register C, then the output of the comparator V sends a set signal to a control unit 8, which immediately interrupts the position-control elements SX1 and/or SX2, by means of a safety circuit (FIG. 5) to be discussed below, so that the motors M1, M2 do not receive any further control signals. The danger of collision is thus prevented. In addition, the drive motors M1, M2 of the cutting portals 1, 2 can be stopped by means of a brake (not shown in greater detail here), whereby the unit reaction time is further improved.

Figure 4:
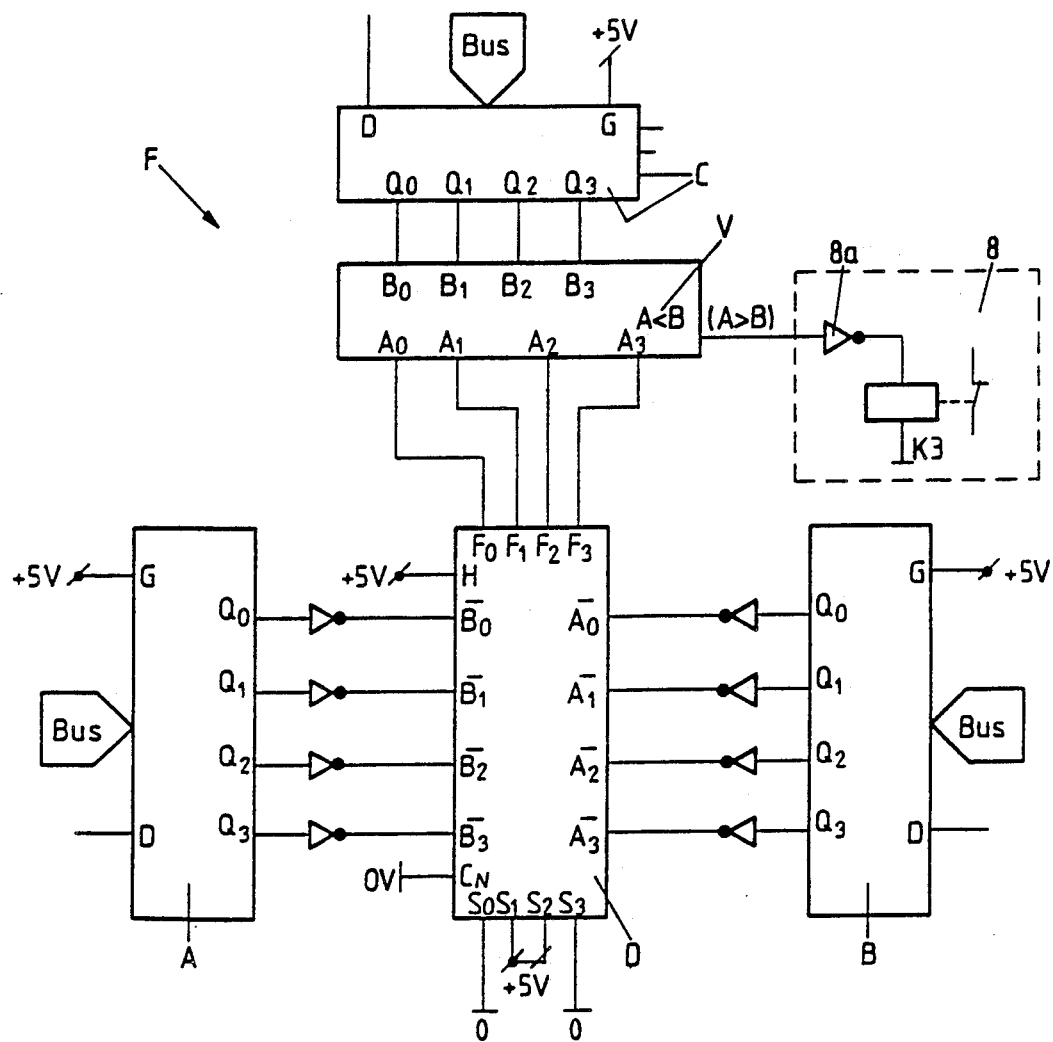
FIG. 4 is a schematic diagram of a simplified 4-bit arithmetic-logical functional unit for explaining the operation of the unit F.

FIG. 4 is a schematic diagram of a circuit which implements the functional unit F just described. For reasons of simplification, only a 4-bit circuit is shown, but this can be expanded to a 32-bit circuit by simple multiplication of the structure. The references entered in the groups of structural components in FIG. 4 designate the various inputs and outputs, which are well-known to the specialist.

In an advantageous manner, the registers A, B, C can each consist of two 4-bit latches (for example, a 74 100 unit). The subtractor D can consist of a 4-bit arithmetic-logical unit (for example, a 74 181 unit). The comparator V can consist of a 4-bit comparator (for example, a 7485 unit). The output from the comparator V to the control unit 8 is referred to as the "A <B output" in common usage. The control unit 8 may consist of an amplifier 8a, a relay K3 connected in series therewith, and the associated switch K3a (see also FIG. 3).

Figure 5:
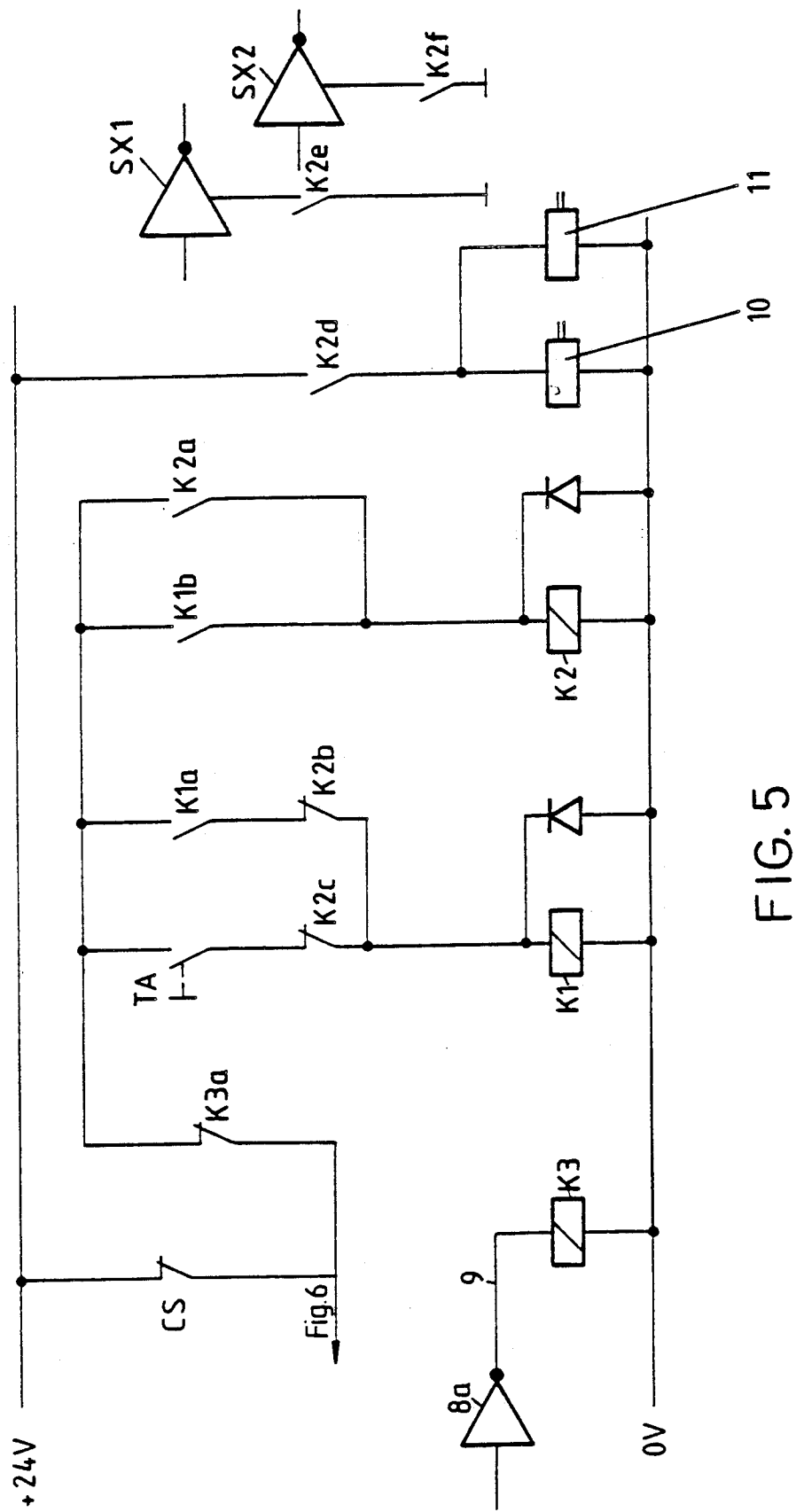
FIG. 5 is a schematic circuit diagram of a safety circuit.

It is advantageous if, in addition to the foregoing, measures are taken to prevent an automatic renewed start-up of the cutting unit after a stop. FIG. 5 is a circuit diagram of an example of an electrical circuit meeting this requirement. In said circuit, an acknowledgment switch is designated by TA, a so-called crash switch by CS, and a plurality of relays or switch-connecting devices by K1–K3.

The operation of this circuit is as follows: To turn on the cutting unit, the switch TA is actuated, so that the relay K1 is actuated and the associated switches K1a, K1b close. As a result, the relay K2 is actuated and the switches K2a, K2d, K2e, K2f close, while the switches K2b, K2c open. As a result, the input current to the relay K1 is cut off and the switches K1a, K1b open. The safety circuit thus has been activated and the position-control elements SX1, SX2 are ready to operate, so that the cutting process can start, assuming appropriate control commands have been given to the position-control elements SX1, SX2.

When the comparator V detects an impending collision of the cutting portals 1, 2, the comparator V emits the control signal which is transmitted via the amplifier 8a and the line 9 to the relay K3, which is then actuated and opens the associated switch K3a. This interrupts the output current from the position control elements SX1 and/or SX2, as a result of which the motors M1, M2 of the cutting portals 1, 2 stop. In addition, the switches K2a, K2d, K2e, K2f are opened and the switches K2b, K2c are closed, because input current to the relay K2 has been cut off. In addition, it can be provided that the motors M1, M2 are braked by means of the schematically represented brakes 10, 11.

Assuming the acknowledgment switch TA is a push button switch, the foregoing arrangement assures that it must be actuated in order to restart the cutting process after an automatic shutdown. In this way it is also assured, for example, that if a threatened collision has been detected by the comparator V, the operator must decide in each case whether a further cutting process is possible or not. At the same time it is impossible for the unit to start up again, which might otherwise have occurred if, for example, position data later entered into the registers A and B no longer indicated any danger of collision and if, due to the absence of a control signal via the line 9, the switch K3a belonging to the relay K3 has remained closed. The same holds true if a transient voltage drop leads to a shutdown of the cutting unit.

The so-called crash switch CS is a mechanical protection against a collision. This switch CS is located on one of the portals 1 or 2, and a feeler or a rod (not shown in greater detail) is placed at the corresponding location of the other portal, the length of said feeler or rod corresponding to the tolerated approach between the portals 1 and 2. If the distance between the portals drops below this value and no control signal is transmitted by the comparator V to the final control unit 8 and its relay K3, then the feeler actuates the switch CS, so that the circuit to the position-control elements SX1 and SX2 is interrupted.

Figure 6:
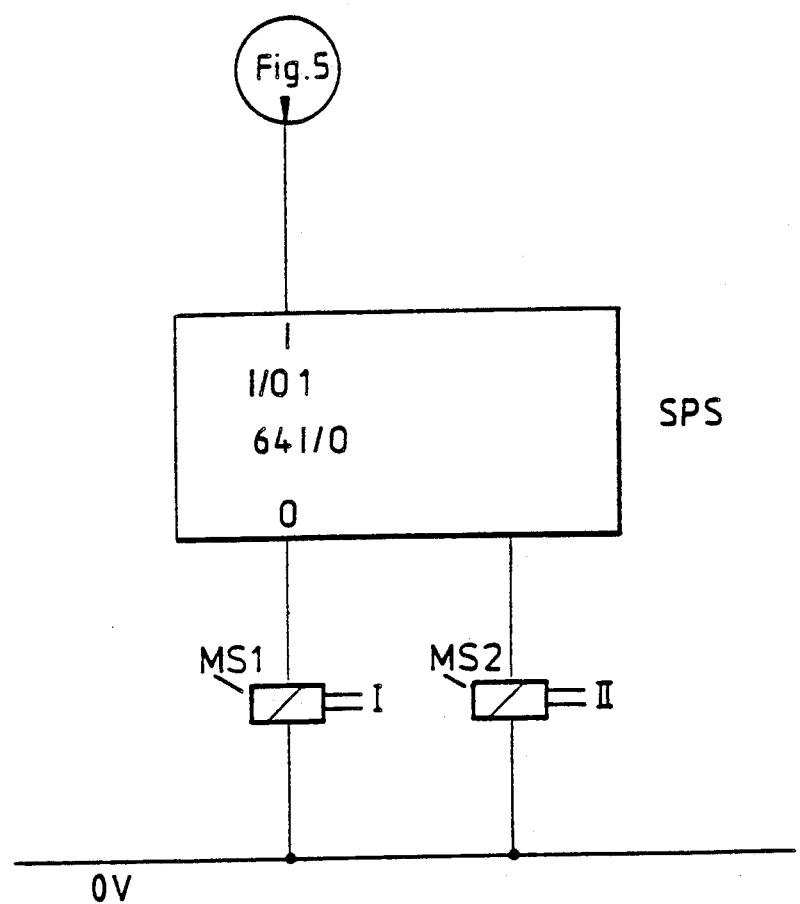
FIG. 6 is a schematic circuit diagram of a circuit for carrying out an emergency shutdown of the cutting jets.

Furthermore, in the event of a collision between the two portals 1, 2, the cutting jets I, II should be turned off and moved into a safe position, in order to prevent additional damage. For this reason, the crash switch CS is electrically connected to the memory-programmable control SPS As seen in FIGS. 5 and 6, the memory-programmable control SPS receives an electrical pulse in the case of a collision, which causes a stored program to be run, with the result that the magnetic switches MS1, MS2 of the cutting jets I, II are activated. Among other operations, the stored program will cause the jets I and II to be shut off and moved in an advantageous manner into a higher position. Since this is not directly related to the arrangement for collision avoidance according to the invention, and since it enters into action only after a collision has occurred, no further detailed explanation has been provided.

Although the invention has been described in connection with a specific embodiment thereof, the appended claims are not so limited, but are to be construed as embodying all modifications and variations that may occur to one of ordinary skill in the art that fairly fall within the teachings set forth herein.

What is claimed is:

1. A cutting unit, having a safety system for preventing the collision of two cutting tools which are movable toward each other in a longitudinal direction of said cutting table, said cutting unit comprising:

a cutting table;

first and second cutting portals which are independently movable longitudinally over said cutting table in said longitudinal direction and are driven respectively by first and second motors;

first and second cutting devices which are respectively movable transversely over the first and second cutting portals; and control means for controlling said motors and cutting devices for cutting asymmetrical patterns from work pieces on said cutting table, and for optimizing a time required to cut said patterns by permitting both of the two cutting portals to occupy at least one given position along said longitudinal direction on said cutting table, but at different times;

said safety system comprising safety means for preventing the cutting portals from colliding by determining when the cutting portals are not separated by a predetermined minimum spacing and controlling the motors to prevent the movement of the cutting portals toward each other when this occurs;

wherein said control means comprises a central computer which receives feedback position data and issues cutting instructions; first and second displacement pickups directly connected to said first and second motors which generate said feedback position data in direct response to running of said first and second motors; and first and second numerical control units responsive to said cutting instructions which issue respective control signals to control said motors to move said cutting portals to positions indicated by said cutting instructions; and said safety means comprises a feedback unit which receives said control signals from said numerical control units and receives said feedback position data generated by said displacement pickups, and determines whether said control signals would cause said cutting portals to be separated by less than said predetermined minimum spacing, and if so, issues a stop signal to stop said motors so that said control signals are not effective; wherein said feedback unit comprises:

first and second input registers which receive said control signals from said first and second numerical control units, respectively;

a subtractor for determining the difference between the contents of said first and second input registers;

a safety zone register which receives said predetermined minimum spacing from said central computer; and a comparator which compares (a) the output of said subtractor with (b) the contents of said safety zone register, and if $a<b$, issues said stop signal;

wherein said control signals are representative of respective instructed cutting position data $P_1(x)$ and $P_2(x)$ which represent longitudinal positions of said first and second cutting portals with respect to a predefined zero point on said cutting unit, and said safety zone register receives respective safety zone data $P(1a)$ and $P(2a)$ for the first and second cutting portals which represent respective safety zone widths for each cutting portal in the longitudinal direction toward the other cutting portal, and said comparator issues said stop signal if said data indicate that the control signals would cause said cutting portals to be separated by less than said safety zones, by issuing said stop signal if $P_1(x)+P(1a)<P_2(x)-P(2a)$.

2. A unit as in claim 1, wherein each said numerical control unit comprises an autarkically operating computer including a program memory and a working memory.

3. A unit as in claim 1, wherein said motors are controlled by respective position-control elements which are normally controlled by said control signals from said numerical control units, but which can be disabled by said stop signal from said feedback unit so as to stop said motors.

4. A unit as in claim 3, wherein a safety circuit provides a signal path from said feedback unit to said motors for said stop signal.

5. A unit as in claim 3, further comprising electrical switching means for interconnecting said feedback unit and said position-control elements so as to stop said motors in response to said stop signal, and prevent any automatic restarting of the motors under control of the numerical control units.

6. A unit as in claim 5, further comprising brake means for said first and second motors which is actuated by said electrical switching means in response to said stop signal.

7. A unit as in claim 5, wherein said control means further comprises feeler means for physically sensing the spacing between the cutting portals, and when the spacing falls below said minimum spacing, physically actuating a crash switch which is comprised in said electrical switching means.

8. A unit as in claim 7, further comprising means responsive to said electrical switching means, for moving said cutting devices away from one another in response to the actuation of said crash switch.

9. A unit as in claim 1, wherein said feedback unit issues said stop signal to said numerical control units.

10. A unit as in claim 1, wherein the control means also controls the motors and cutting devices, such that two respective cuts are completed by said two cutting portals substantially simultaneously, thereby optimizing a total time required to complete said two cuts.

11. A unit as in claim 10, wherein respective pluralities of cuts are completed substantially simultaneously by said two cutting portals, thereby optimizing the total time required to complete said two pluralities of cuts.

12. A unit as in claim 1, wherein the control means also controls the motors and cutting devices, such that two respective cuts are completed by said two cutting portals substantially simultaneously, thereby optimizing a total time required to complete said two cuts.

13. A unit as in claim 12, wherein respective pluralities of cuts are completed substantially simultaneously by said two cutting portals, thereby optimizing the total time required to complete said two pluralities of cuts.

14. A unit as in claim 1, wherein said feedback unit receives said feedback position data via said numerical control units.

15. A unit as in claim 14, wherein said feedback unit issues said stop signal to said numerical control units.

* * * * *